US008120807B2

(12) United States Patent  (10) Patent No.: US 8,120,807 B2
Honma  (45) Date of Patent: Feb. 21, 2012

(54) INFORMATION PROCESSING APPARATUS, INFORMATION PROCESSING METHOD, PROGRAM, AND RECORDING MEDIUM

(75) Inventor: Tomoyuki Honma, Kizugawa (JP)

(73) Assignee: Sharp Kabushiki Kaisha, Osaka (JP)

(*) Notice: Subject to any disclaimer, the term of this patent is extended or adjusted under 35 U.S.C. 154(b) by 644 days.

(21) Appl. No.: 12/253,389

(22) Filed: Oct. 17, 2008

(65) Prior Publication Data

US 2009/0122336 A1  May 14, 2009

(30) Foreign Application Priority Data

Nov. 13, 2007 (JP) ................................. 2007-294425

(51) Int. Cl.
  *G06F 3/12* (2006.01)
  *G06K 15/00* (2006.01)
(52) U.S. Cl. ..................... 358/1.15; 358/1.18; 358/450
(58) Field of Classification Search .................. None
  See application file for complete search history.

(56) References Cited

U.S. PATENT DOCUMENTS

| | | | | |
|---|---|---|---|---|
| 5,278,673 A | * | 1/1994 | Scapa et al. | 358/473 |
| 5,826,237 A | * | 10/1998 | Macrae et al. | 705/2 |
| 6,606,451 B2 | * | 8/2003 | Honda et al. | 386/233 |
| 6,853,461 B1 | * | 2/2005 | Shiimori | 358/1.15 |
| 7,016,596 B2 | * | 3/2006 | Itoh | 386/243 |
| 7,061,640 B1 | * | 6/2006 | Maeda | 358/1.17 |
| 2005/0134903 A1 | | 6/2005 | Tanimoto et al. | |

FOREIGN PATENT DOCUMENTS

| | | |
|---|---|---|
| JP | 60-66569 A | 4/1985 |
| JP | 9-8983 A | 1/1997 |
| JP | 2003-037693 A | 2/2003 |
| JP | 2003-283743 A | 10/2003 |
| JP | 2004-282439 A | 10/2004 |
| JP | 2005-176008 A | 6/2005 |

* cited by examiner

*Primary Examiner* — Dov Popovici
(74) *Attorney, Agent, or Firm* — Birch, Stewart, Kolasch & Birch, LLP

(57) ABSTRACT

An information processing apparatus stores therein selected to-be-transmitted image data and the predetermined transmission order of image data, and displays a list of the stored to-be-transmitted image data according to the predetermined transmission order. When receiving an instruction to edit the transmission order of a displayed list of image data, the information processing apparatus displays stored to-be-transmitted image data according to an edited transmission order, and stores the edited transmission order. When receiving an instruction to fax, the information processing apparatus combines to-be-transmitted image data into a single image data to transmit the combined image data to an image transmitting apparatus, based on the stored edited transmission order.

9 Claims, 12 Drawing Sheets

FIG. 4

| No. | PAGE NUMBER | FILE NAME | COLOR MODE | FORMAT | RESOLUTION |
|---|---|---|---|---|---|
| 1 | 2 | a.jpg | COLOR | JPEG | 600 dpi |
| 2 | 1 | b.tif | MONOCHROME | TIF | 300 dpi |
| ... | ... | ... | ... | ... | ... |

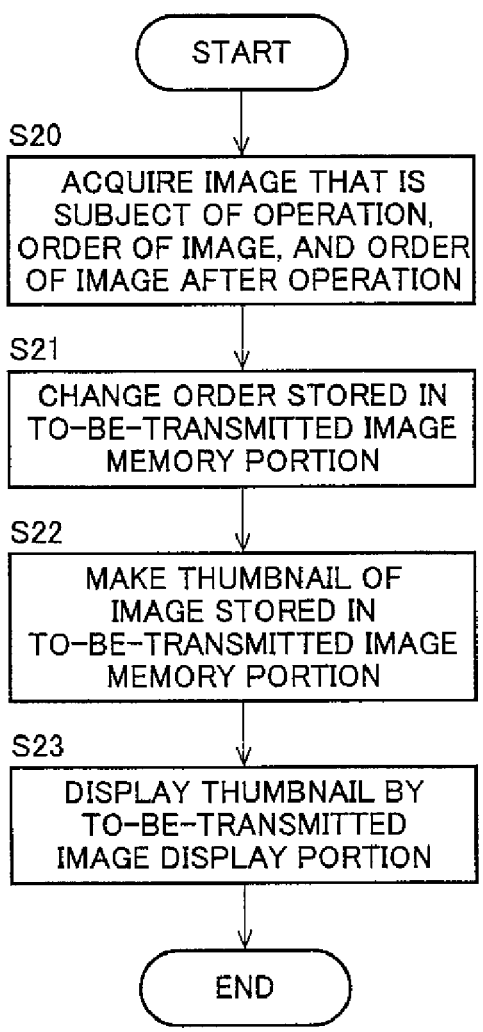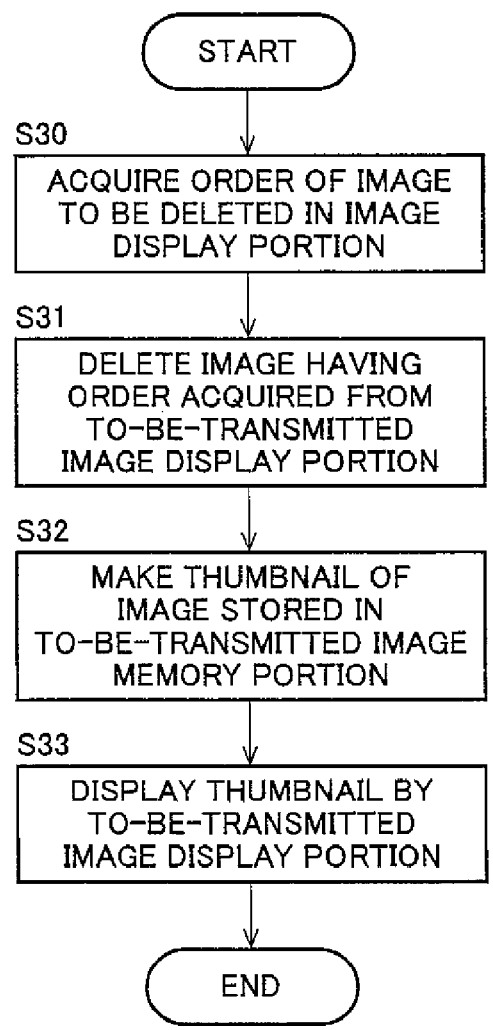

FIG. 11

| CONDITION TYPE | CONDITION | COLOR MODE | FORMAT | RESOLUTION |
|---|---|---|---|---|
| IMAGE CONTENTS | TEXT | MONOCHROME | PDF | 300 dpi |
| FILE SIZE | 3 MB OR MORE | MONOCHROME | TIF | 200 dpi |
| ... | ... | ... | ... | ... |

INFORMATION PROCESSING APPARATUS, INFORMATION PROCESSING METHOD, PROGRAM, AND RECORDING MEDIUM

CROSS-NOTING PARAGRAPH

This Nonprovisional application claims the benefit of priority under 35 U.S.C. §119(a) on Patent Application No. 2007-294425 filed in JAPAN on Nov. 13, 2007, the entire contents of which are hereby incorporated herein by reference.

FIELD OF THE INVENTION

The present invention relates to an information processing apparatus, an information processing method, a program, and a recording medium that process in advance image data to be transmitted by an image transmitting apparatus to transmit the processed image data to the image transmitting apparatus.

BACKGROUND OF THE INVENTION

Methods of specifying an image and its transmission destination using an information processing apparatus, such as a personal computer(PC), for an image transmitting apparatus, such as a facsimile, connected to the information processing apparatus via a network have become popular in these days. Most of these methods, however, enable specifying only one document at one time of transmission. When a user wants to send a plurality of documents to one destination, therefore, the user has to send the documents in a plurality of times of transmission. This may force the user to carry out a number of operations, and, because a communication line is usually disconnected for every transmission request, may lead to higher communication charges.

Japanese Laid-Open Patent Publication No. 2003-37693 discloses a method of efficient fax transmission which combines data for a plurality of fax transmission requests and transmits the combined data at a time. According to this method, in data transmission to the same destination, data for a plurality of fax transmission requests are combined and are transmitted at a time so as to achieve efficient data transmission and reduce communication charges.

According to the method disclosed in Japanese Laid-Open Patent Publication No. 2003-37693, every time a fax transmission request is received, a port at which a job having the same fax number is present is selected out of a plurality of fax transmission ports, based on a fax number specified by the current Fax transmission request, and the current fax transmission request is assigned to the selected port. If a user gives an instruction for data combination, the current fax transmission request job is added to the end of the jobs having the same fax number (combined jobs). Afterward, when fax transmission timing arrives, data in a plurality of combined jobs are written consecutively to a data buffer assigned to the selected port to be combined as data to be faxed.

According to the above method, however, the current fax transmission request job is added to the end of jobs having the same fax number, so that the data can be faxed only in the same order as the order that transmission requests are conducted. In other words, when the user selects data as to-be-transmitted data hoping that the data is faxed in the combined form, the transmission order of the data cannot be changed once the data has been selected as to-be-transmitted data.

It is preferable that the user be able to check information about to-be-transmitted data (outline, transmission order, etc., of the data). Japanese Laid-Open Patent Publication No. 2003-37693, however, discloses or suggests nothing about this point.

SUMMARY OF THE INVENTION

An object of the present invention is to allow a user to check information (transmission order, etc.) about to-be-faxed image data when a plurality of image data are combined and are faxed to the same address, and even after selecting a plurality of image data as to-be-faxed image data, to allow the user to change the transmission order of the image data.

Another object of the present invention is to provide an information processing apparatus comprising: a to-be-transmitted image memory portion that stores therein a plurality of to-be-transmitted image data and image-data-related information including a transmission order of these image data; a to-be-transmitted image display portion that displays a list of the stored to-be-transmitted image data according to the transmission order; an image editing portion that edits the stored transmission order to have an edited transmission order stored; and an image converting portion that combines the to-be-transmitted image data into a single image data; wherein when receiving an instruction to edit the transmission order of the displayed list of the image data, the image editing portion edits the stored transmission order according to the received instruction to have an edited transmission order stored, wherein the to-be-transmitted image display portion displays a list of the to-be-transmitted image data according to the edited transmission order, and wherein when receiving an instruction to transmit image data, the image converting portion combines the to-be-transmitted image data based on the stored transmission order to generate image data which is to be transmitted to an image transmitting apparatus.

Another object of the present invention is to provide the information processing apparatus comprising a transmission image condition memory portion that stores therein a transmission image condition for image data to be transmitted to the image transmitting apparatus, wherein when the image data to be transmitted to the image transmitting apparatus does not meet the transmission image condition, the image converting portion carries out a given image process on the image data so that the image data meets the transmission image condition.

Another object of the present invention is to provide the information processing apparatus, wherein the transmission image condition includes a condition as to whether being an image composed of only text or any one of conditions for a paper size, a file size, a color mode, a compression format, and a file format of image data, or a combination of a condition as to whether being an image composed of only text and conditions for a paper size, a file size, a color mode, a compression format, and a file format of image data.

Another object of the present invention is to provide the information processing apparatus, wherein the given image process is a process on any one of a paper size, a file size, a color mode, a compression format, and a file format of image data, or a process on a combination of a paper size, a file size, a color mode, a compression format, and a file format of image data.

Another object of the present invention is to provide the information processing apparatus, wherein editing a transmission order of the image data includes deleting the to-be-transmitted image data.

Another object of the present invention is to provide the information processing apparatus, wherein the display of a list of the image data is carried out using thumbnail images.

Another object of the present invention is to provide an information processing method comprising: storing selected to-be-transmitted image data and image-data-related information including a predetermined transmission order of image data when receiving an instruction to select to-be-transmitted image data out of a plurality of image data; displaying a list of the stored to-be-transmitted image data according to the predetermined transmission order; displaying a list of the stored to-be-transmitted image data according to an edited transmission order and storing the edited transmission order when receiving an instruction to edit a transmission order of the displayed list of the image data; and combining the to-be-transmitted image data into a single image data and transmitting the combined image data to an image transmitting apparatus, based on the stored edited transmission order, when receiving an instruction to transmit image data.

Another object of the present invention is to provide a program operable to drive a computer to execute the information processing method described above.

Another object of the present invention is to provide a recording medium that is computer-readable and records the program described above thereon.

BRIEF DESCRIPTION OF THE DRAWINGS

FIG. 4 depicts an example of information stored in a to-be-transmitted image memory portion;

FIGS. 8A and 8B are flowcharts indicating examples of a transmission order change process in the information processing apparatus of the present invention;

FIG. 11 depicts an example of information stored in a transmission image condition memory portion.

PREFERRED EMBODIMENTS OF THE INVENTION

Figure 1:
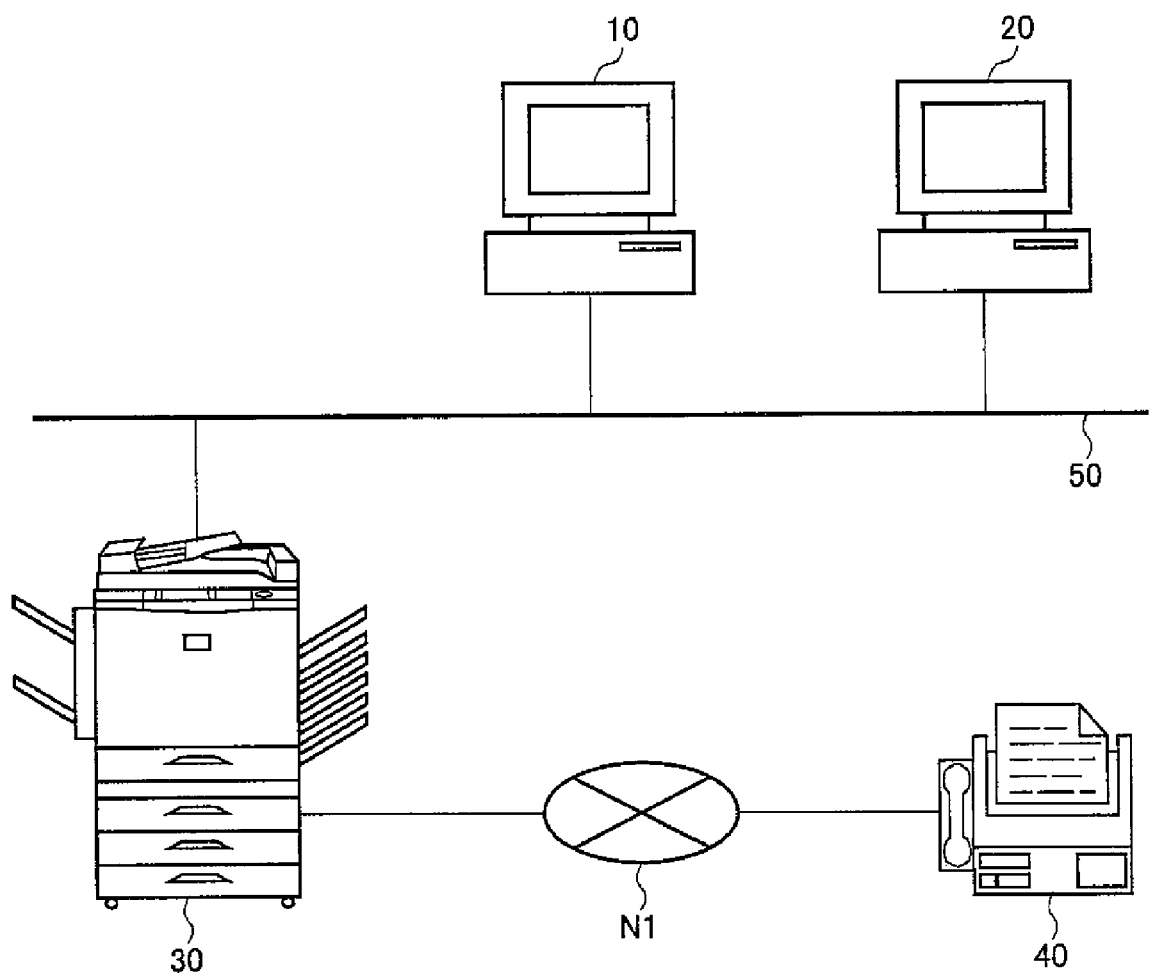
FIG. 1 depicts an image transmitting system that is constructed by connecting an information processing apparatus of the present invention to an image transmitting apparatus via a local area network.
Figure 2:
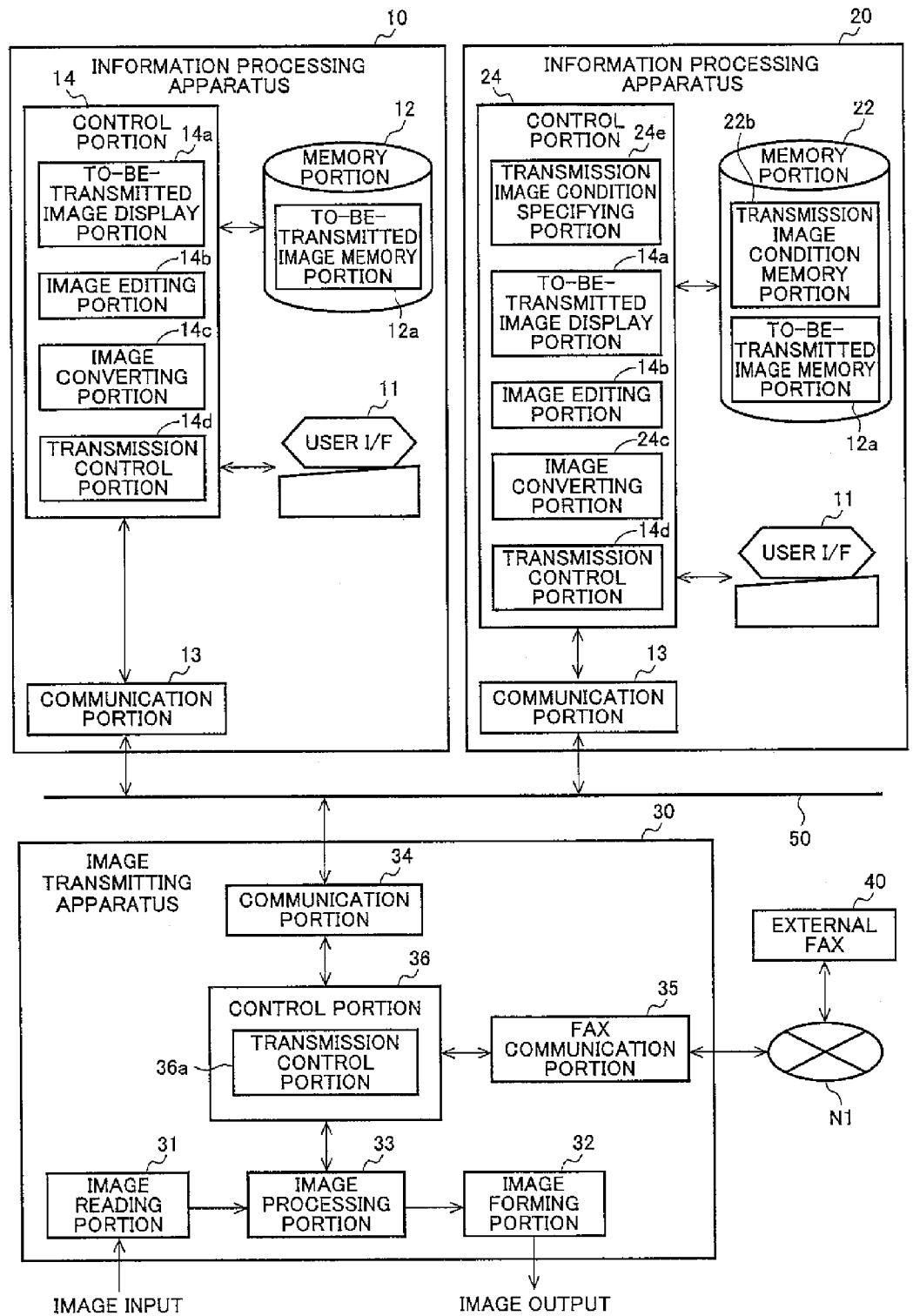
FIG. 2 depicts an internal configuration of the information processing apparatus and the image transmitting apparatus shown in FIG. 1.

FIG. 1 depicts an image transmitting system that is constructed by connecting an information processing apparatus of the present invention to an image transmitting apparatus via a local area network (LAN), and FIG. 2 depicts an internal configuration of the information processing apparatus and the image transmitting apparatus shown in FIG. 1.

The image transmitting system is the system constructed by interconnecting the information processing apparatus 10 and/or the information processing apparatus 20 and the image transmitting apparatus 30, such as a facsimile and multifunction peripheral, via the LAN 50, as shown in FIG. 1.

First Embodiment

In FIGS. 1 and 2, the information processing apparatus 10 is depicted as one embodiment of the information processing apparatus of the present invention. The information processing apparatus 10 may be modified into the information processing apparatus 20, which will be described later.

The information processing apparatus 10 and the image transmitting apparatus 30 connected thereto for mutual communication will be described first with reference to FIGS. 1 and 2, using FIGS. 3 to 9.

The information processing apparatus 10 combines a plurality of image data selected by a user as to-be-faxed data, and transmits the combined image data and information about a fax transmission destination specified by the user, to the image transmitting apparatus 30. The information processing apparatus 10 allows the user to check information about to-be-faxed data and even after the user selected image data as to-be-faxed image data, allows the user to change the fax transmission order of the image data (i.e., order of the image data in combined image data).

The information processing apparatus 10 includes a user interface (I/F) 11, a memory portion 12, a communication portion 13, and a control portion 14, which will be explained in the following description.

The user I/F 11 receives user operation. The user I/F 11 is composed of a display means, such as a liquid crystal panel, etc., that displays information necessary for an operation, and an input means including such a pointing device as mouse, a keyboard, etc., through which information like a control command is input by user operation. Through the user I/F 11, the user is able to select (specify) to-be-faxed image data (to-be-transmitted data), change the order of to-be-transmitted image data, give an instruction to fax, input a fax address, specify an image form at the time of data combining, and input a transmission image condition that will be described later. Image data refers to data that can be selected as to-be-faxed data among a plurality of data.

Figure 3:
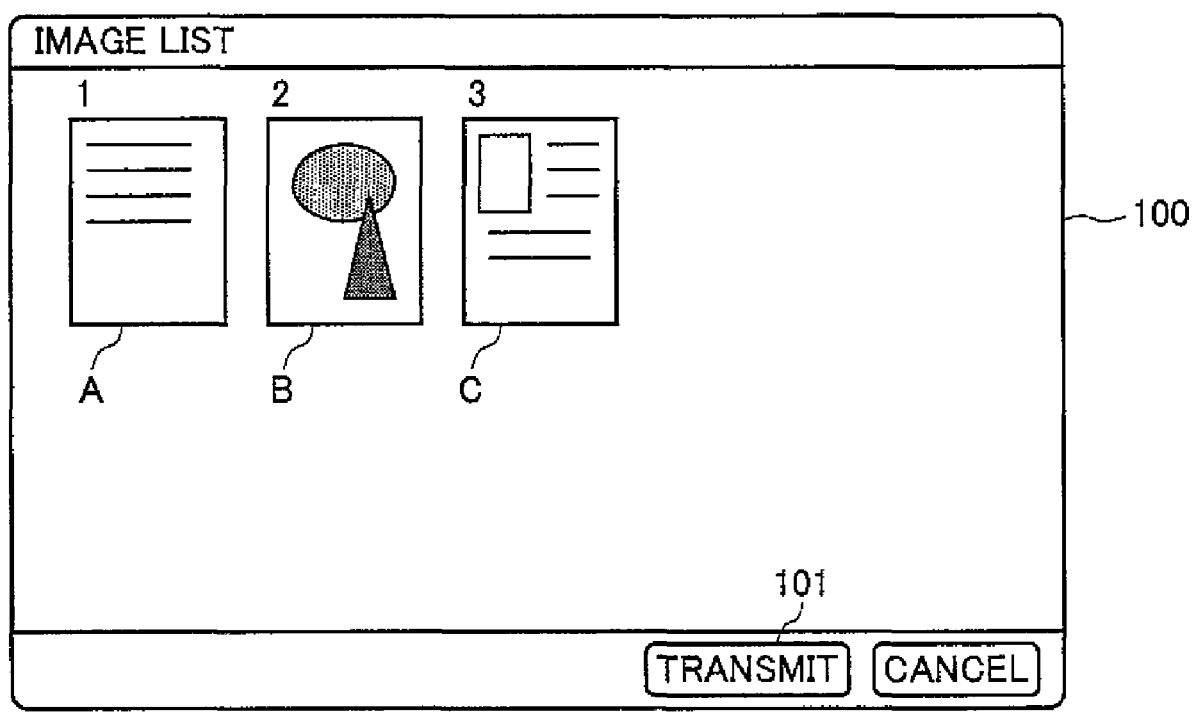
FIG. 3 depicts an example of a screen that is displayed on a display means of a user I/F by the information processing apparatus of the present invention.

FIG. 3 depicts an example of a screen that is displayed on the display means of the user I/F 11 by the information processing apparatus of the present invention.

So as to enable check on information about to-be-faxed data, the information processing apparatus 10 displays thumbnails (A, B, and C) of to-be-transmitted image data that are selected by the user through the user I/F 11, as shown on a screen 100 of FIG. 3. The thumbnails A, B, and C are, for example, displayed in order from the left to the right according to the order of selection of the data corresponding to the thumbnails. On the screen 100, the display position (display order) of a thumbnail of each to-be-transmitted data corresponds to the transmission order of each to-be-transmitted data having the thumbnail. The user, therefore, is able to check information about the to-be-transmitted image data (outline, transmission order, etc., of the image data) on the screen 100.

In this manner, so as to enable check on information about to-be-faxed data (e.g., outline of the data), the information processing apparatus 10 is capable of displaying a list of the data according to the transmission order of the data. FIG. 3 depicts an example in which thumbnail images are used to exhibit an outline of to-be-transmitted image data when a list of the to-be-transmitted image data is displayed according to the transmission order of the to-be-transmitted image data. In displaying listed data, for example, file names, file sizes, formats, resolutions, etc., may be displayed along with the listed data.

In the information processing apparatus 10, an order of displaying to-be-transmitted image data immediately after the selection thereof is arbitrary order. At least, when the user specifies a transmission order in advance (includes a case that the user specifies the transmission order at the time of selection of to-be-transmitted image data), to-be-transmitted image data can be displayed according to the specified transmission order. In the following description, when to-be-transmitted image data is selected out of a plurality of image data, the selected image data is displayed immediately after the selection at the position from which the selected image data is to be transmitted last.

The memory portion 12 stores therein various pieces of information including all image data, and is composed of a RAM, ROM, etc. The memory portion 12 includes a to-be-transmitted image memory portion 12a that stores therein to-be-transmitted image data to be transmitted to a specific address. The to-be-transmitted image memory portion 12a is capable of storing therein the transmission order and thumbnail image of each to-be-transmitted image data, in addition to to-be-transmitted image data itself.

FIG. 4 depicts an example of information stored in the to-be-transmitted image memory portion. The to-be-transmitted image memory portion 12a stores therein, for example, the transmission order (written in a "No." column) and the file name (written in a "File Name" column) of to-be-transmitted image data linking each other. In addition to the file name of to-be-transmitted image data, the to-be-transmitted image memory portion 12a may also store therein the color mode, format, resolution, etc., of the to-be-transmitted image data.

In the example shown in FIG. 4, stored information about image data to be transmitted first includes a file name "a.jpg", a colormode "color", a format "JPEG", and a resolution "600 dpi". Stored information about image data to be transmitted second includes a file name "b.tif", a color mode "monochrome", a format "TIF", and a resolution "300 dpi".

When to-be-transmitted image data are displayed as thumbnails images from the left to the right according to the transmission order of the Image data, as shown in the example of the screen of FIG. 3, if the data of FIG. 4 is used, the information processing apparatus 10 refers to the information indicated in FIG. 4 and the information about the thumbnail images that are stored in the to-be-transmitted image memory portion 12a, and displays the first image data having the file name "a.jpg" at the leftmost position on the screen as a thumbnail image while displaying the second image data having the file name "b.tif" on the right to the first image data as a thumbnail image.

In FIG. 4, the third image data is not included in the stored information, so that only the first and second image data are displayed but the third and following image data are not displayed on the UI screen.

The to-be-transmitted image memory portion 12a may store therein information about a storage location For to-be-transmitted image data, instead of storing to-be-transmitted image data itself, and store the storage location and the order of the to-be-transmitted image data in combined image data linking each other.

The communication portion 13 has a function to connect the information processing apparatus to the image transmitting apparatus 30 via a network (LAN 50) to communicate with the image transmitting apparatus 30. Through the communication portion 13, image data made by combining to-be-transmitted image data is transmitted from the information processing apparatus 10 to the image transmitting apparatus 30, and an instruction to fax the combined image data is given.

The control portion 14 controls the whole of the information processing apparatus 10, and is composed of a CPU that carries out calculation and a RAM, etc., in which stores temporary information accompanying calculation. The control portion 14 has a to-be-transmitted image display portion 14a, an image editing portion 14b, an image converting portion 14c, and a transmission control portion 14d.

The to-be-transmitted image display portion 14a carries out control so as to display a list of information about to-be-transmitted image data on a display means, etc., based on the contents stored in the to-be-transmitted image memory portion 12a. For example, as shown on the screen 100 of FIG. 3, the to-be-transmitted image display portion 14a displays thumbnail images for image data currently specified as to-be-transmitted image data, based on a stored transmission order on the display means, etc., of the user I/F 11.

The image editing portion 14b has a function in causing the to-be-transmitted image memory portion 12a to store therein to-be-transmitted image data selected by the user, changing the transmission order of to-be-transmitted image data, and the like. In the present invention, changing the transmission order of to-be-transmitted image data includes deleting to-be-transmitted image data. This transmission order change is carried out by editing (rewriting or deleting) the contents stored in the to-be-transmitted image memory portion 12a.

To-be-transmitted image data is added through an operation carried out by the user to select to-be-transmitted image data. An example of a process of adding to-be-transmitted image data will be described.

When the user carries out the operation for selecting to-be-transmitted image data on the user I/F 11, input based on the operation for selecting is given to the control portion 14. Based on the input, the image editing portion 14b causes the to-be-transmitted image memory portion 12a to store therein image data selected by the operation for selecting as to-be-transmitted image data. The image editing portion 14b also obtains and generates information about the image data stored in the to-be-transmitted image memory portion 12a, and causes the to-be-transmitted image memory portion 12a to store the information therein. As a result, the to-be-transmitted image display portion 14a carries out control so as to display a screen to which information about to-be-transmitted image data is added, based on the contents stored in the to-be-transmitted image memory portion 12a.

When the user adds to-be-transmitted data, for example, the user may carry out so-called "drag and drop operation" to a thumbnail of image data the user wants to transmit, using the input means (mouse, etc.) of the user I/F 11, on such a screen as the screen 100 of FIG. 3 that is displayed on the display means of the user I/F 11.

The information processing apparatus may be provided with a printer driver for data displaying on the window shown in FIG. 3. When the user opens image data (file) the user wants to transmit with a dedicated application software and carries out an operation (to print out the image data) using the printer driver, the information processing apparatus recognizes the operation as an operation of selecting to-be-transmitted image data, and may additionally display the image specified by the user in the same manner as described above.

Figure 5A:
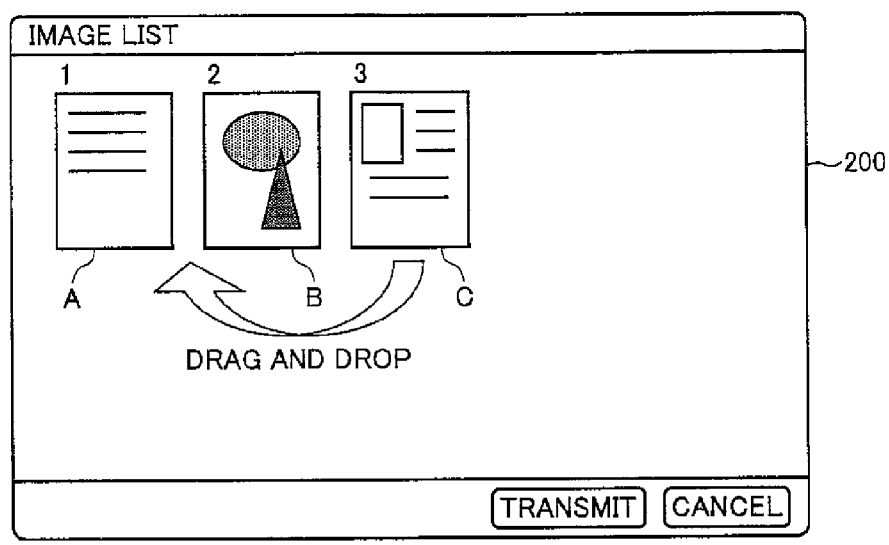
FIGS. 5A to 5C are explanatory views of examples of operations that are carried out by a user when the user changes a transmission order.
Figure 5B:
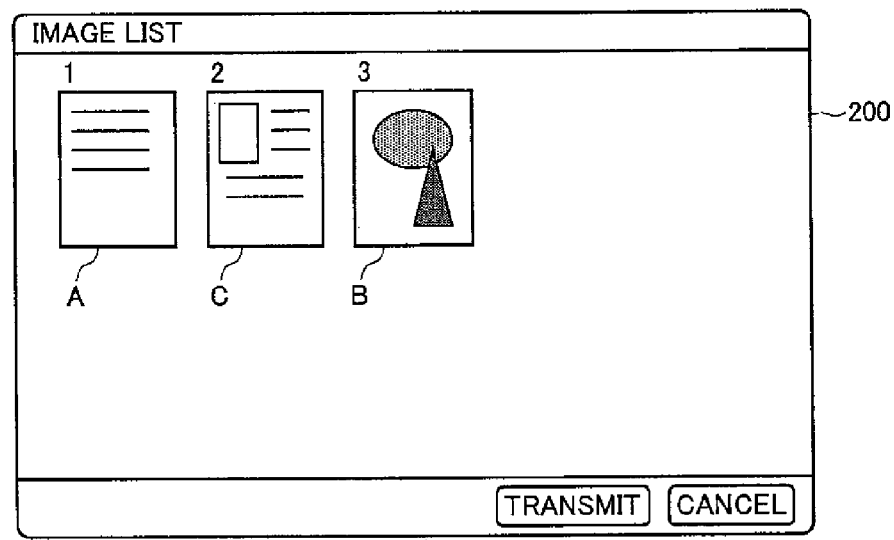
Figure 5C:
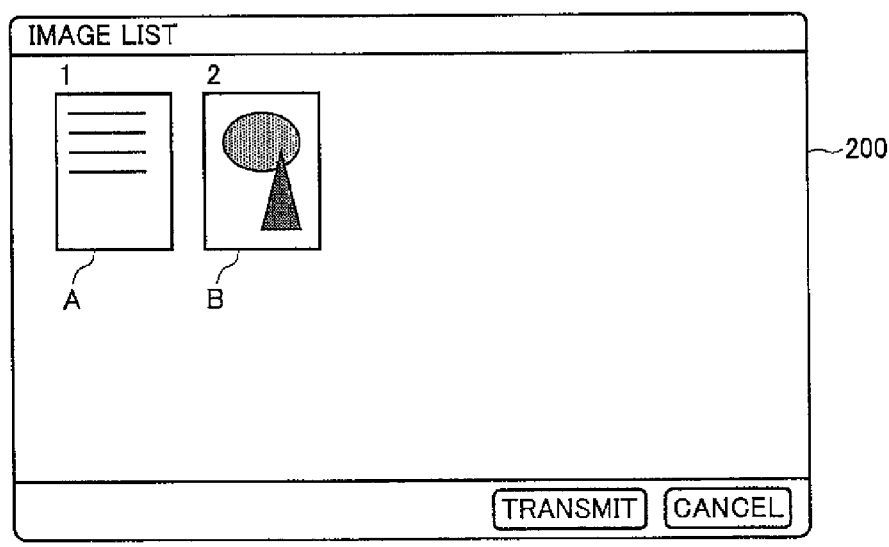

A change in a transmission order is, for example, carried out through an operation by a user on the window of FIG. 3. FIGS. 5A to 5C are explanatory views of examples of operations that are carried out by the user when the user changes a transmission order. FIG. 5A depicts an operation carried out on the UI screen of FIG. 3, FIG. 5B depicts a UI screen that is displayed after a transmission order has been changed, and FIG. 5C depicts a UI screen that is displayed after to-be-transmitted image data has been deleted.

When changing a transmission order, the user drags a thumbnail on the UI screen 200 that represents image data whose transmission order is to be changed, to a display position for a desired transmission order, and drops the thumbnail at the display position, as shown in FIG. 5A. As a result, as shown in FIG. 5B, the display position of thumbnails on the UI screen 200 is changed, and the transmission order correlated with the display position is also changed. In the following description, data having a thumbnail A, data having a thumbnail B, and data having a thumbnail C are referred to as data A, data B, and data C, respectively.

In the examples of FIGS. 5A and 5B, the transmission order of the data A is not changed and remains first before and after the drag and drop operation. The transmission order of the data C, which is third before the operation, however, is changed to second as a result of dragging the thumbnail image of the data C to a position between the data A and data B and dropping the thumbnail at the position. The transmission order of the data B, which is second before the drag and drop operation, is changed to third after the operation.

When the user carries out the order change operation (drag and drop operation) shown in FIGS. 5A and 5B on the user I/F 11 to enable transmission order change, input based on the order change operation is given to the control portion 14 in the information processing apparatus 10. Based on the input, in the control portion 14, the image editing portion 14b edits (changes) information about the order of the to-be-transmitted image data stored in the to-be-transmitted image memory portion 12a. As a result, in line with the transmission order of to-be-transmitted image data, the to-be-transmitted image display portion 14a displays a screen on which the display position of information about to-be-transmitted image data is changed, based on the contents stored in the to-be-transmitted image memory portion 12a.

When deletion of to-be-transmitted image data, which is an instance of transmission order change, is carried out, the user selects a thumbnail image on the UI screen of FIG. 3 that represents image data (image data to be deleted) the user wants to delete from to-be-transmitted image data, using a mouser etc., making up the user I/F 11. The user then presses a "delete" key on the keyboard or manipulates the mouse to select a "delete" menu. As a result, the selected thumbnail of image data disappears from the UT screen, as shown in FIG. 5C.

In the example of FIG. 5C, the transmission order of the image data A and that of the data B are not changed and remain first and second before and after the operation for deleting to-be-transmitted image data. The thumbnail image of the data C whose transmission order is third before the operation for deleting, however, is deleted from the UI screen as a result of the operation for deleting. Because of this, the data C is no longer to-be-transmitted image data.

When the user carries out the operation for deleting on the user I/F 11 to enable to delete image data, input based on the operation for deleting is given to the control portion 14 in the information processing apparatus 10. Based on the input, in the control portion 14, the image editing portion 14b deletes to-be-transmitted image data stored in the to-be-transmitted image memory portion 12a and selected as the subject of deletion, from the memory portion 12a, and edits information about the order of other stored to-be-transmitted image data when necessary. The to-be-transmitted image display portion 14a then displays a screen whose contents displayed is changed, based on the contents stored in the to-be-transmitted image memory portion 12a.

When receiving an instruction to Lax, the image converting portion 14c combines (a plurality of) stored to-be-transmitted image data, based on the contents stored in the to-be-transmitted image memory portion 12a. It is preferable that the user be allowed to specify an image form to be used at the time of data combining carried out by the image converting portion 14c. For this reason, when the user clicks a transmission button 101 on the UI screen 100 of FIG. 3, the information processing apparatus of the present embodiment causes the display means of the user I/F 11 to display a setting dialog box for setting an image form to be used at the time of data combining carried out by the image converting portion 14c.

Figure 6:
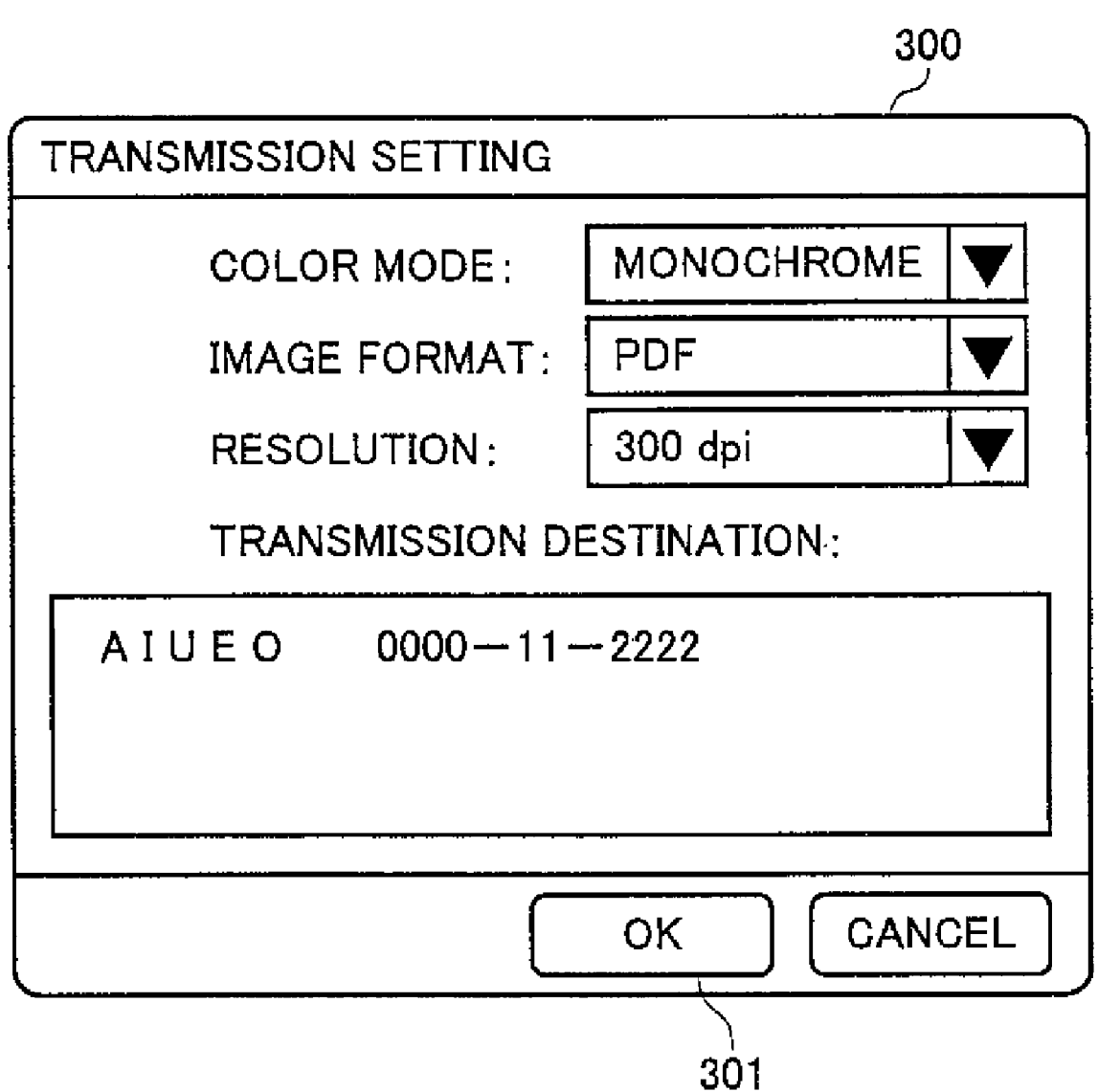
FIG. 6 depicts an example of a setting dialog box.

FIG. 6 depicts an example of the setting dialog box. It is possible to set a color mode, an image format, and a resolution that are set as elements of an image form to be used at the time of combining to-be-transmitted image data on the setting dialog box 300 of FIG. 6. In FIG. 6, "monochrome" is set as the color mode, "PDF" is set as the image format, and "300 dpi" is set as the resolution. In addition to setting of an image form to be used at the time of data combining, it is also possible to set a transmission destination on the setting dialog box 300. In this example, "a i u e o" is set as the name of the transmission destination, and "0000-11-2222" is set as the fax number of the transmission destination.

In the information processing apparatus 10, when receiving an instruction to fax resulting from clicking an OK button 301 of the setting dialog box 300, and the like, the image converting portion 14c reads in image data displayed as thumbnail images on the UI screen 100, etc., just before reception of the instruction and information about the transmission order of to-be-transmitted image data, from the to-be-transmitted image memory portion 12a. The image converting portion 14c then combines a plurality of read to-be-transmitted image data according to the read transmission order in an image form set on the setting screen 300.

The transmission control portion 14d generates transmission instruction information giving an instruction to transmit image data converted (combined) at the image converting portion 14c to the set transmission destination, and sends the generated transmission instruction information to the image transmitting apparatus 30 via the communication portion 13. The transmission instruction information contains information of a fax transmission destination (fax number), etc.

The image transmitting apparatus 30 faxes image data combined by the information processing apparatus 10 to the set fax transmission destination, based on the received transmission instruction information. The image transmitting apparatus 30 includes an image reading portion 31, an image forming portion 32, an image processing portion 33, a communication portion 34, a fax communication portion 35, and a control portion 36.

The image reading portion 31 reads an image recorded on a recording paper to generate image data, and is composed of a CCD, etc., that takes in a manuscript image as image data. The image forming portion 32 forms image data on a recording paper. The image processing portion 33 converts image data for image formation into image data adapted to fax transmission, or converts image data adapted to fax transmission into image data for image formation. The communication portion 34 is used to connect the information processing apparatus to the image transmitting apparatus 30 for mutual communication via the network (LAN 50). The fax communication portion 35 works for carrying out fax communication, and is connected to a public line network N1. The control portion 36 controls the whole of the image transmitting portion 30, and is composed of a CPU that carries out calculation and a RAM, etc., that stores temporary information accompanying calculation therein.

The image transmitting apparatus 30 is able to cause the fax communication portion 35 to receive image data transmitted from an external facsimile 40 via the public line network N1, cause the image processing portion 33 to convert the received image data into image data for image formation, and cause the image forming portion 32 to form an image out of the converted image data.

The image transmitting apparatus 30 is also able to cause the image processing portion 33 to convert image data, which is generated by the image reading portion 31 or acquired from the outside and is stored in a memory (not shown in figure), etc., into image data for fax communication, and fax the converted image data to the external facsimile 40 via the public line network N1 connected to the fax communication portion 35.

Particularly, the image transmitting apparatus 30 is capable of faxing image data converted (combined) by the information processing apparatus to an address set by the user. To achieve this, the image transmitting apparatus 30 receives transmission instruction information generated by the information processing apparatus via the communication portion 34, and causes the image processing portion 33 to convert the received image data into image data for fax communication. Then, a transmission control portion 36a in the control portion 36 carries out control so as to fax the image data, which has been converted by the information processing apparatus and has been processed by the image processing portion 33 for fax communication, to an address based on the transmission instruction information via the fax communication portion 35.

Figure 7:
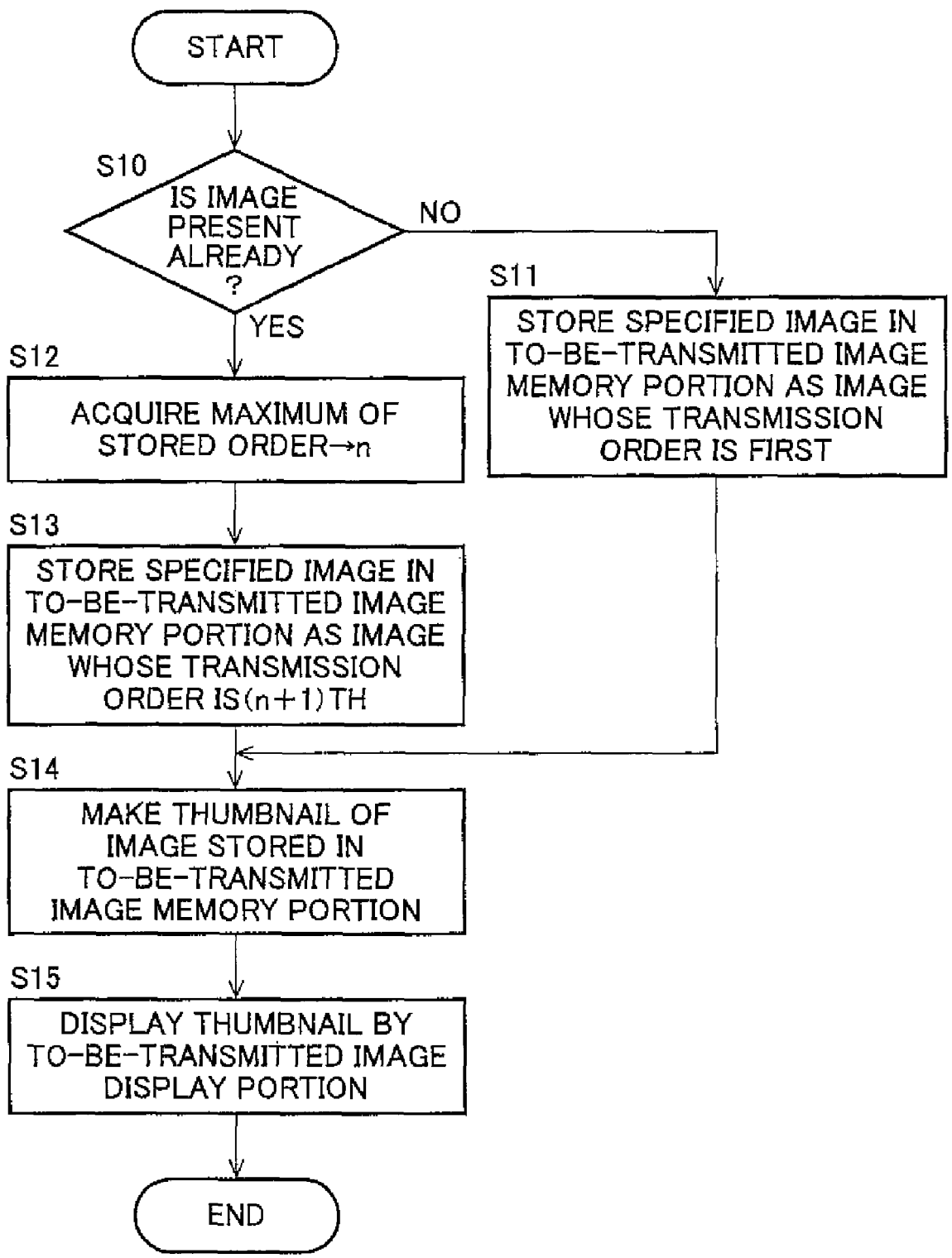
FIG. 7 is a flowchart indicating an example of a to-be-transmitted image display process in the information processing apparatus of the present invention.

FIG. 7 is a flowchart indicating an example of a to-be-transmitted image display process in the information processing apparatus of the present invention. For example, when the user specifies to-be-transmitted image data, the image editing portion 14b determines whether image data is already present in the to-be-transmitted image memory portion 12a (step S10), as shown in FIG. 7. When image data is not present (NO) the specified image data is saved in the to-be-transmitted image memory portion 12a as the image data whose transmission order is first (step S11), and the process flow proceeds to step S14.

When image data is already present in the to-be-transmitted image memory portion 12a at step S10 (YES), the maximum number "n" of stored transmission orders is acquired (step S12) The specified image data is saved in the to-be-transmitted image memory portion 12a as the image data whose transmission order is ("n"+1)th (step S13), which means that the specified image data is saved as the image data whose transmission order is the last. The process flow then proceeds to step S14. At this time, information about the specified image data is acquired and is stored together with information about the transmission orders in the to-be-transmitted image memory portion 12a.

At step S14, the to-be-transmitted image display portion 14a makes thumbnails of all to-be-transmitted image data stored in the to-be-transmitted image memory portion 12a. The made thumbnails are, for example, linked to the order of the image data out of which the thumbnails are made, and are stored in the to-be-transmitted image memory portion 12a. The thumbnails are then displayed on the display means, etc., of the user I/F 11 according to the stored transmission order (step 15).

FIGS. 8A and 8B are flowcharts indicating examples of a transmission order change process in the information processing apparatus of the present invention.

For example, when the user drags and drops a thumbnail on the UI screen 100 of FIG. 3 to change a transmission order, the image editing portion 14b identifies to-be-transmitted image data that is the subject of the drag and drop operation, and acquires the order "O"th of the identified image data and an order "P"th corresponding to a position at which the thumbnail of the image data is dropped on the UI screen 100 (step S20), as shown in FIG. 8A.

Then, according to acquired information, a transmission order stored in the to-be-transmitted image memory portion 12a is changed (step S21) This is carried out, for example, by changing the order of the identified image data to "P" and changing the orders of other to-be-transmitted image data whose orders before the drag and drop operation are "O"+(1 to "P")th, to "O" to ("P"−1)th. In the drag and drop operation shown in FIG. 5A, the order of the image data placed third before the operation is changed to "second", and the order of the image data placed second before the operation is changed to "third". When the order change is over, thumbnails are made out of all to-be-transmitted image data stored in the to-be-transmitted image memory portion 12a (step S22). Then, the to-be-transmitted image display portion 14a causes the display means, etc., of the user I/F 11 to display the made thumbnails according to the stored transmission order (step S23). In the above example, the thumbnails are displayed in their changed order, that is, at their changed display position, as shown in FIG. 5B.

When the user carries out, for example, an operation of selecting and deleting a thumbnail on the UI screen 100 of FIG. 3, the image editing portion 14b acquires the order of image data out of which the thumbnail to be deleted is made (step S30), as shown in FIG. 8B. Then, the image data having the acquired order is deleted from the to-be-transmitted image memory portion 12a, and the number of the order of each of image data, which is stored in the to-be-transmitted image memory portion 12a and is placed after the acquired order, is reduced by one in order to change (step S31). When the process at step S31 is over, thumbnails are made out of all to-be-transmitted image data stored in the to-be-transmitted image memory portion 12a (step S32). Then, the to-be-transmitted image display portion 14a causes the display means, etc., of the user I/F 11 to display the made thumbnails according to the stored transmission order (step S33). When the thumbnail of the third image data is deleted from the UI screen of FIG. 3, the third image data is no longer to-be-transmitted image data through the process described above. As a result, the thumbnail of the third image data is not displayed any more (after being deleted) but only the thumbnails made out of the first and second to-be-transmitted image data are displayed, as shown in FIG. 5C.

Figure 9:
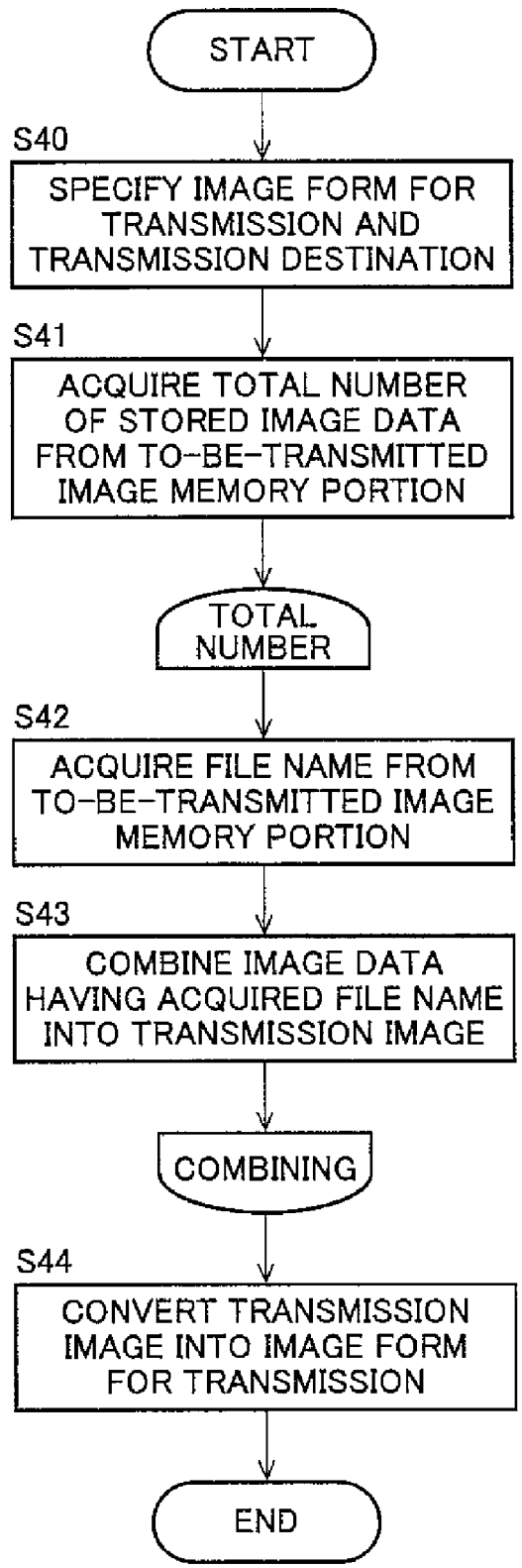
FIG. 9 is a flowchart indicating an example of an image conversion process in the information processing apparatus of the present invention.

FIG. 9 is a flowchart indicating an example of an image conversion process in the information processing apparatus of the present invention. In this example, the to-be-transmitted image memory portion 12a does not store therein to-be-transmitted image data itself, but stores therein the file name of the to-be-transmitted image data. If to-be-transmitted image data itself is needed for the process, the to-be-transmitted image memory portion 12a acquires the to-be-transmitted image data, based on the file name, from a certain memory means having stored therein to-be-transmitted image data itself.

When the user presses the transmission button 101 on the UI screen 100 of FIG. 3, the image converting portion 14c caused the display means, etc., of the user I/F 11 to display the setting dialog box 100 of FIG. 6 to let the user specify (set) an image form for transmission and a transmission destination (step S40). The image converting portion 14c then acquires the total number of stored image data from the to-be-transmitted image memory portion 12a (step S41), acquires the file name of each of image data to the total number of the image data (step S42), and combines the image data having the acquired file names with a transmission image (step S43). Then, the transmission image is converted into the image form specified at step S40 (step S44).

After the above process, the transmission control portion 14d instructs the image transmitting apparatus 30 to transmit the image converted at step S44 to the transmission destination specified at step S40.

Second Embodiment

An information processing apparatus of a second embodiment will be described with reference to FIGS. 1 and 2, using FIGS. 10 to 12. Constituent elements of the second embodiment that are the same as constituent elements of the first embodiment will be denoted by the same reference numerals, and are omitted in further description.

The information processing apparatus 20 shown in FIG. 2 carries out an additional conversion process on combined/converted image data when the image data does not satisfy a transmission image condition that is specified in advance by the user. The information processing apparatus 20 includes the user I/F 11, a memory portion 22, the communication portion 13, and a control portion 24.

The memory portion 22 is different from the memory portion 12 of the first embodiment in the point that the memory portion 22 has a transmission image condition memory portion 22b, which will be described later.

The control portion 24 is different from the control portion 14 of the first embodiment in the point that the control portion 24 has a transmission image condition specifying portion 24e and that the function of the image converting portion is not the same.

The transmission image condition specifying portion 24e is used to specify a transmission image condition. A transmission image condition is a condition for combined image data specified in advance by the user, and is a condition for converting the combined image data based on a given processing method when the combined image data does not meet the condition. FIG. 10 depicts an example of a transmission image condition setting screen for specifying a transmission image condition. The transmission image condition specifying portion 24e is capable of displaying and controlling the transmission image condition setting screen. A transmission image condition may be specified as a condition for the contents of an image, such as "text image", or as a condition for the file size of to-be-transmitted image data, such as "image of 3 MB or less", as shown in FIG. 10. In other cases, for example, a transmission image condition may be any one of conditions on the paper size, the file size, the color mode, the compression format, and the file format of image data, or may be a combination of a condition as to whether being an image composed of only text and conditions for the paper size, the file size, the color mode, the compression format, and the file format of image data.

Using the transmission image condition specifying portion 24e, the user is able to specify not only a transmission image condition but also a given processing method that is carried out on combined image data when the combined image data does not meet the condition. The given processing method is, for example, is the method of processing on any one of the paper size, the file size, the color mode, the compression format, and the file format of image data, or the method of processing on a combination of the paper size, the file size, the color mode, the compression format, and the file format of image data.

When a plurality of transmission image conditions are present, the transmission image conditions may include a transmission image condition for which determination as to whether combined image data meets the condition is made by priority. In other words, the transmission image conditions may be given respective priority levels.

Figure 10:
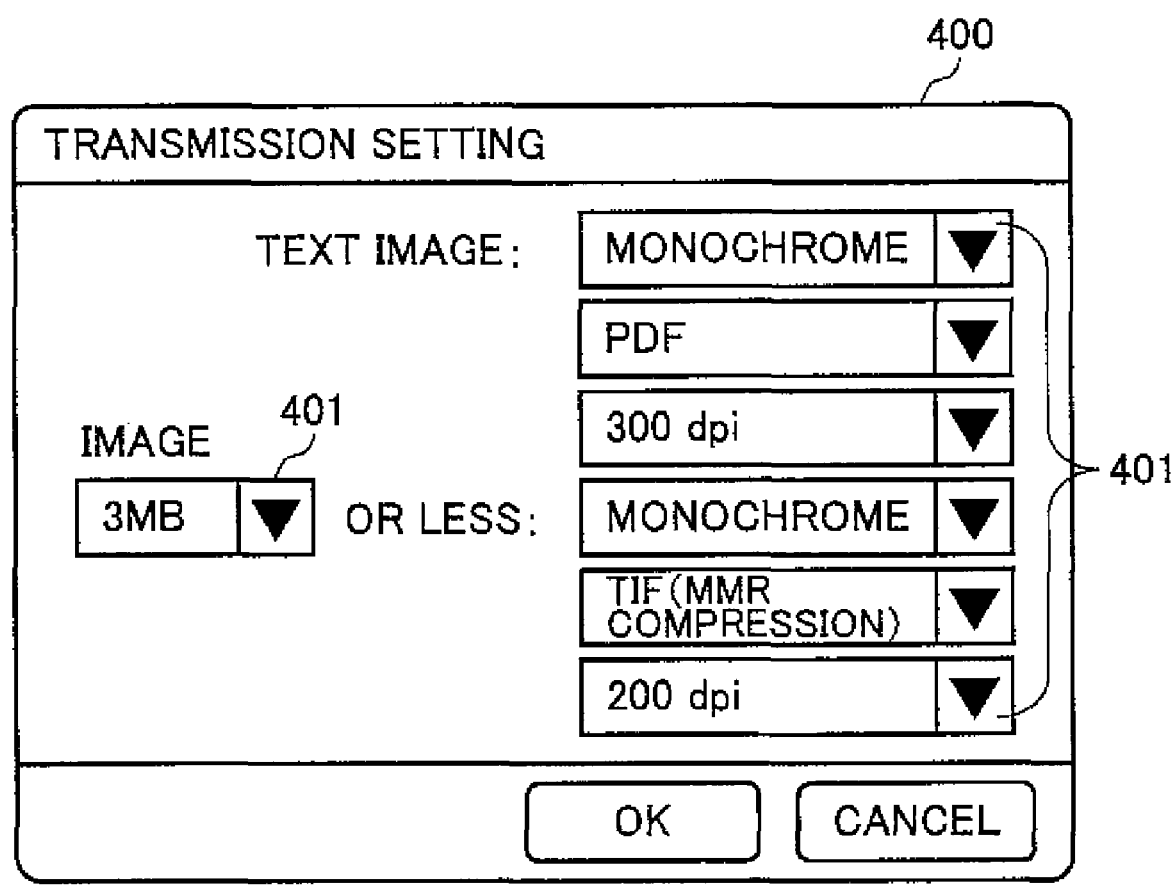
FIG. 10 depicts an example of a transmission image condition setting screen.

On a transmission image condition setting screen 400 in an example of FIG. 10, a condition that combined image data consists of "text image" is specified as a first transmission image condition that is given high priority to determination as to whether image data meets the condition, and a condition that the file size of the combined image data is "3 MB or less" is specified as a second transmission image condition that is lower priority than the priority of the first transmission image condition. In FIG. 10, when the first transmission image condition is not satisfied, it is specified to carry out the processing method on the combined image data before transmission thereof so as to determine a color mode to be "monochrome", a file format to be "PDF", and a resolution to be "300 dpi". Likewise, when the second transmission image condition is not satisfied, it is specified to carry out the image process so as to determine the color mode to be "monochrome", the file format to be "TIF (MMR compression)", and the resolution to be "200 dpi".

The transmission image condition memory portion 22b will then be described. The transmission image condition memory portion 22b stores therein transmission image conditions and given processing methods. FIG. 11 depicts an example of information stored in the transmission image condition memory portion 22b. As shown in FIG. 11, the transmission image condition memory portion 22b stores therein, for example, transmission image conditions (combination of conditions written in a "condition type" column and conditions written in a "condition" column) and contents of image process to be carried out when a condition is not met (contents written in a "color mode" column, in a "formats" column, and in a "resolution" column) linking each other.

When the user specifies a transmission image condition or a given processing method, for example, the user clicks a pull-down menu button 401 on the transmission image condition setting screen 400 of FIG. 10 and selects a desired item out of alternative items appearing on the screen. In the information processing apparatus 20, the transmission image condition specifying portion 24e changes the contents stored in the transmission image condition memory portion 22b, based on this user operation.

When receiving an instruction to fax, the image converting portion 24c, like the image converting portion 14c of the information processing apparatus 10, combines (a plurality of) to-be-transmitted image data stored in the to-be-transmitted image memory portion 12a in an image form set by the user at the time of giving a transmission instruction, based on the contents stored in the to-be-transmitted image memory portion 12a. Unlike the image converting portion 14c, however, the image converting portion 24c compares the image data combined in the set image form with a transmission image condition stored in the transmission image condition memory portion 22b. If the comparison reveals that the image data does not meet the transmission image condition, the image converting portion 24c carries out an image conversion process specified for the transmission image condition to the image data combined in the set image form, based on the contents stored in transmission image condition memory portion 22b.

The information processing apparatus 20 having the above constituent elements is capable of combining a plurality of image data in an image form set at the time of giving an instruction to fax, carrying out an image process specified in advance by the user to the combined image data when the combined image data does not meet a transmission image condition specified in advance by the user, and faxing the image data which has been subjected to the image process via the image transmitting apparatus 30. As a result, for example, when a file size is specified as a transmission image condition and execution of an image process is specified to set image data to a low resolution, the information processing apparatus 20 is able to fax combined image with a reduced size even if combined image data turns out to be extremely large. This prevents an increase in communication charges.

Figure 12:
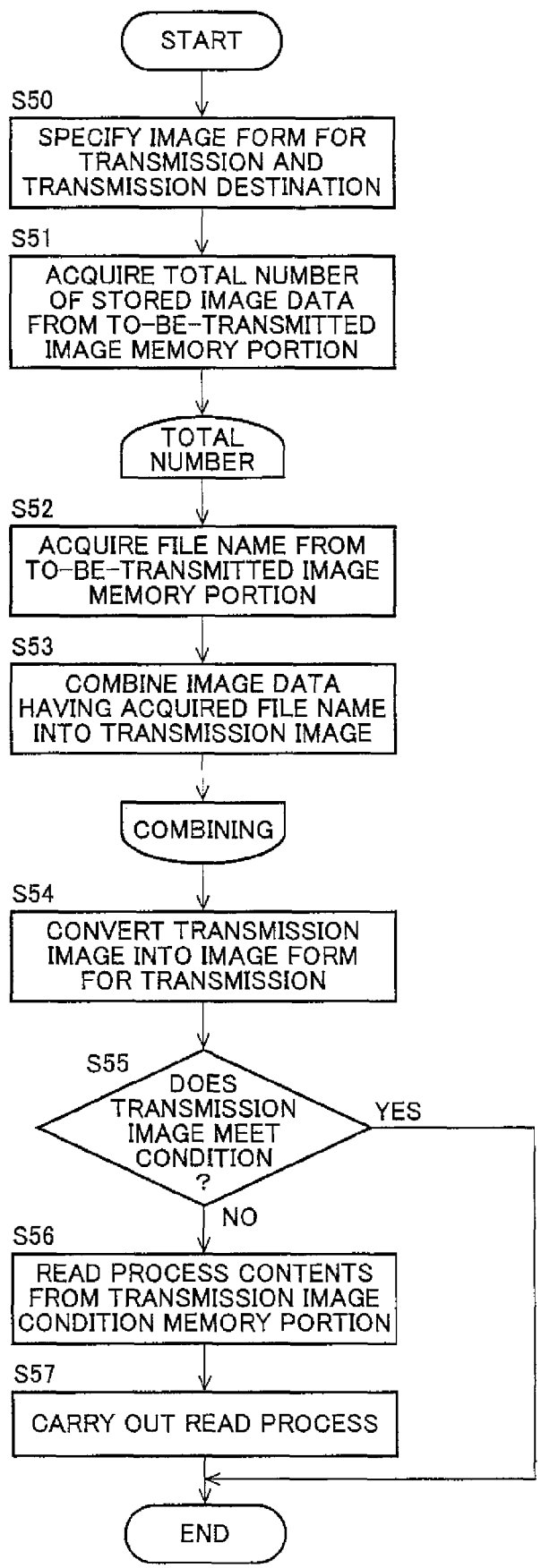
FIG. 12 is a flowchart indicating another example of the image conversion process in the information processing apparatus of the present invention.

FIG. 12 is a flowchart indicating another example of the image conversion process in the information processing apparatus of the present invention. Processes at steps S50 to S54 of FIG. 12 are the same as processes at steps S40 to of FIG. 9, and are, therefore, omitted in further description.

In the information processing apparatus 20, after step S54, a transmission image resulting from conversion at step S54 is compared with a transmission image condition stored in the transmission image condition memory portion 22b (step S55) When the transmission image meets the transmission image condition (YES), the image conversion process is terminated. When the transmission image does not meet the transmission image condition (NO), however, contents of process for the transmission image condition is read from the transmission image condition memory portion 22b (step S56), and an image process reflecting the read contents of process is carried out on the transmission image (step S57).

Following the above process, the transmission control portion 14d instructs the image transmitting apparatus 30 to transmit the image converted at step 557 to a transmission destination specified at step S50.

When transmission image conditions are stored in the manner shown in FIG. 11, processes at steps S55 to S57 are carried out in the following manner. First, a transmission image is analyzed to determine whether the transmission image is the "text image". When the transmission image is not the "text image", contents of image ("monochrome" as a color mode, "PDF" as a format, "300 dpi" as a resolution) is read from the transmission image condition memory portion, and the image conversion is carried out to convert the transmission image into the image reflecting the read contents of image. The file size of the transmission image is calculated to determine whether the file size is "3 MB or less". When the file size is not "3 MB or less", contents of image ("monochrome" as a color mode, "tif" as a format, "200 dpi" as a resolution) is read from the transmission image condition memory portion, and the image conversion is carried out to convert the transmission image into the image reflecting the read contents of image.

A program according to the present invention is a program that controls a CPU, etc., (a program that causes a computer to function) to achieve the functions of the information processing apparatus of the present invention, or a program that causes a computer to execute an information processing method of the present invention. Information handled in the information processing apparatus is temporarily accumulated in a RAM when the information is processed, is subsequently stored in various ROMs or HDDs, and is read out, amended, and written in by the CPU as necessary.

A recording medium to record the program thereon may be provided as any one of a semiconductor medium (e.g., ROM, nonvolatile memory card, etc.), an optical recording medium (e.g., DVD, MO, MD, CD, BD, etc.), and a magnetic recording medium (e.g., magnetic tape, flexible disc, etc.).

Executing the loaded program achieves the functions of the above embodiments. In addition, processing in cooperation with an operating system or another application program, etc., based on an instruction from the program may also achieve the functions of the present invention.

For distributing to the market, the program may be recorded on a portable recording medium to be distributed or maybe transferred to a server computer connected via a network, such as the Internet. In this case, a memory device of the server computer is regarded as the recording medium of the present invention.

The present invention offers the following effect.

According to the present invention, when a plurality of image data are combined and are faxed to the same destination, a user is able to check information about to-be-faxed image data, and even after selecting a plurality of image data as to-be-faxed image data, is able to change the transmission order of the image data.

The invention claimed is:

1. An information processing apparatus comprising:
    a to-be-transmitted image memory portion that stores therein a plurality of to-be-transmitted image data and image-data-related information including a transmission order of each of the image data;
    a to-be-transmitted image display portion that displays a list of the stored to-be-transmitted image data according to the transmission order stored in the to-be-transmitted image memory portion;
    an image editing portion that edits the transmission order stored in the to-be-transmitted image memory portion to provide and store an edited transmission order in place of any previously stored transmission order; and
    an image converting portion that combines the to-be-transmitted image data into a single image data when receiving an instruction to transmit image data; wherein
    when receiving an instruction to edit the transmission order of the displayed list of individual image data, the image editing portion edits the transmission order stored in the to-be-transmitted image memory portion according to the received instruction to provide and store the edited transmission order in place of any previously stored transmission order, wherein
    the to-be-transmitted image display portion displays a list of the to-be-transmitted image data according to the edited transmission order, and wherein
    when receiving the instruction to transmit image data, the image converting portion combines the to-be-transmitted image data based on the transmission order currently stored in the to-be-transmitted image memory portion to generate the single image data which is transmitted to an image transmitting apparatus.

2. The information processing apparatus as defined in claim 1, further comprising:
    a transmission image condition memory portion that stores therein a transmission image condition for image data to be transmitted to the image transmitting apparatus;
    the image converting portion determines when the single image data to be transmitted to the image transmitting apparatus does not meet the transmission image condition, and then the image converting portion carries out a given image process on the image data so that the image data meets the transmission image condition.

3. The information processing apparatus as defined in claim 2, wherein the transmission image condition includes a condition as to whether being an image composed of only text or any one of conditions for a paper size, a file size, a color mode, a compression format, and a file format of image data, or a combination of a condition as to whether being an image composed of only text and conditions for a paper size, a file size, a color mode, a compression format, and a file format of image data.

4. The information processing apparatus as defined in claim 2, wherein the given image process is a process on any one of a paper size, a file size, a color mode, a compression format, and a file format of image data, or a process on a combination of a paper size, a file size, a color mode, a compression format, and a file format of image data.

5. The information processing apparatus as defined in claim 1, wherein editing a transmission order of the image data includes deleting selected ones of the to-be-transmitted image data from the transmission order.

6. The information processing apparatus as defined in claim 1, wherein the display of a list of the image data is carried out using thumbnail images.

7. An information processing method comprising:

storing selected to-be-transmitted image data and image-data-related information including a predetermined transmission order of the image data determined when receiving an instruction to select to-be-transmitted image data out of a plurality of image data;

displaying a list of the stored to-be-transmitted image data according to the predetermined transmission order;

displaying a list of the stored to-be-transmitted image data according to an edited transmission order and storing the edited transmission order to replace the predetermined transmission order when receiving an instruction to edit a transmission order of the displayed list of the image data; and combining the to-be-transmitted image data into a single image data and transmitting the combined single image data to an image transmitting apparatus, based on the stored edited transmission order, when receiving an instruction to transmit image data.

8. A non-transitory recording medium that is computer-readable and records a program to drive a computer to execute the information processing method as defined in claim 7 thereon.

9. The information processing method as defined in claim 7, further comprising:

storing a transmission image condition for the single image data to be transmitted to the image transmitting apparatus in a transmission image condition memory portion;

determining when the single image data to be transmitted to the image transmitting apparatus does not meet the transmission image condition stored in the transmission image condition memory portion, and then carrying out a given image process on the single image data so that the single image data being transmitted to the image transmitting apparatus meets the transmission image condition.

* * * * *